US009755919B2

(12) United States Patent
Kersch et al.

(10) Patent No.: US 9,755,919 B2
(45) Date of Patent: Sep. 5, 2017

(54) TRAFFIC ANALYSIS FOR HTTP USER AGENT BASED DEVICE CATEGORY MAPPING

(71) Applicant: Telefonaktiebolaget L M Ericsson (publ), Stockholm (SE)

(72) Inventors: Péter Kersch, Budapest (HU); Gabor Nemeth, Budapest (HU); László Toka, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 705 days.

(21) Appl. No.: 14/254,189

(22) Filed: Apr. 16, 2014

(65) Prior Publication Data

US 2014/0317278 A1    Oct. 23, 2014

(30) Foreign Application Priority Data

Apr. 22, 2013 (EP) .................... 13164646

(51) Int. Cl.
*G06F 15/173* (2006.01)
*H04L 12/26* (2006.01)
*H04L 29/08* (2006.01)
*H04L 12/14* (2006.01)
*H04M 15/00* (2006.01)

(52) U.S. Cl.
CPC ............ *H04L 43/04* (2013.01); *H04L 43/026* (2013.01); *H04L 67/02* (2013.01); *H04L 67/22* (2013.01); *H04L 12/1407* (2013.01); *H04L 43/028* (2013.01); *H04M 15/41* (2013.01); *H04M 15/58* (2013.01); *H04M 15/62* (2013.01)

(58) Field of Classification Search
USPC ....................................... 709/224
See application file for complete search history.

(56) References Cited

U.S. PATENT DOCUMENTS

2012/0240197 A1    9/2012    Tran et al.

FOREIGN PATENT DOCUMENTS

WO    2012129113 A1    9/2012

OTHER PUBLICATIONS

Sandvine, "Case Study: Sandvine Tethered Device Detection Solution and Service Revenue Enhancement", Apr. 14, 2011. All Pages.*
Chung, Jae Y. et al., "Application Traffic Identification Based on Remote Subnet Grouping", 2012 14tth Asia-Pacific Network Operations and Management Symposium (APNOMS), Seoul, Republic of Korea, Sep. 25-27, 2012, pp. 1-8.

(Continued)

*Primary Examiner* — Hee Soo Kim
(74) *Attorney, Agent, or Firm* — Murphy, Bilak & Homiller, PLLC

(57) ABSTRACT

A traffic analysis system monitors data traffic in a communication network. In the data traffic, flows are detected which are based on the Hypertext Transfer Protocol (HTTP). For each of the flows, a data record is created. The data record comprises at least a User Agent identifier from a message header of a HTTP message of the flow and a device identifier of a user equipment transmitting the flow. The data records are analyzed to determine a mapping of at least one User Agent identifier in the data records to a corresponding device category.

13 Claims, 7 Drawing Sheets

(56) References Cited

OTHER PUBLICATIONS

Schulz, Steffen et al., "Tetherway: A Framework for Tethering Camouflage", Proceedings of the Fifth ACM Conference on Security and Privacy in Wireless and Mobile Networks (WISEC '12), New York, USA, 2012, pp. 149-160.
Fielding, R., et al., "Hypertect Transfer Protocol—HTTP/1.1," Network Working Group; RFC 2616; Obsoletes: 2068; Standards Track. IETF. The Internet Society. Jun. 1999. pp. 1-176.
Third Generation Partnership Project, "3GPP TS 23.203 V12.0.0 (Mar. 2013)," 3rd Generation Partnership Project; Technical Specification Group Services and System Aspects; Policy and charging control architecture (Release 12). Mar. 2013. pp. 1-183.
Author Unknown, "Case Study: Sandvine Tethered Device Detection Solution and Service Revenue Enhancement," Sandvine. Intelligent Broadband Networks. Case Study. 2011. pp. 1-7.

* cited by examiner

TRAFFIC ANALYSIS FOR HTTP USER AGENT BASED DEVICE CATEGORY MAPPING

RELATED APPLICATIONS

This application claims priority under 35 U.S.C. §119 from European Patent Application No. 13164646.5 filed on 22 Apr. 2013, the content of said application incorporated herein by reference in its entirety.

TECHNICAL FIELD

The present invention relates to methods for analyzing data traffic and to corresponding devices.

BACKGROUND

In some communication networks, such as cellular mobile network, various kinds of end devices may be used to access the communication network. More detailed knowledge about the end devices may be beneficial for various purposes. While for example usage of individual device identifiers (e.g., in the form of an International Mobile Equipment Identity) is known for mobile devices, corresponding identifiers may not be available for other device types. Further, for privacy reasons such device identifiers may be accessible only in certain parts of the communication network.

For example, in some cases a data connection of a user equipment (UE) may be shared with one or more other devices, which is also referred to as "tethering". Accordingly, although the data connection of this UE is associated with a single subscription, which may be intended to be used with a certain device type, e.g., with a mobile phone, it is also used by other multiple devices, or even simultaneously by multiple devices. For example, tethering may allow for using a data connection of a mobile phone also for a tablet computer or Personal Computer (PC).

Such different device types may also have characteristic usage patterns, and a data plan of a subscription may be determined according to such characteristic usage pattern. For example, the characteristic usage pattern of a mobile phone may result in lower traffic volume than the characteristic usage pattern of a PC. Accordingly, tethering activity may also affect the network operator's costs due to the traffic volume which needs to be handled in the communication network. It may therefore be desirable for the network operator to detect tethering activity and to take appropriate measures to limit such tethering activity. On the other hand, allowing tethering activity in some cases may be desirable, e.g., if a subscriber pays for a subscription feature allowing tethering activity. Also, allowing tethering between a mobile phone and a tablet might be considered to be acceptable due to similar resulting traffic volumes, while allowing tethering of a mobile phone with respect to a PC may be considered to be not acceptable. Accordingly, usage of differentiated traffic control policies with respect to tethering is desirable. For detection of tethering activity, more detailed knowledge about end devices connected directly or indirectly to the communication network may be helpful.

Known solutions for tethering detection may rely on heuristic combination of rules that take into account different aspects of user activity, e.g., a Hypertext Transfer Protocol (HTTP) user agent field in user-generated messages, a number of parallel data traffic flows, or registered device of the user. Significant manual effort may be required to define such rules. Specific solutions which allow for detecting tethering and enforcing corresponding traffic control policies are for example described in WO 2012/129113 A1, or "Case Study: Sandvine Tethered Device Detection Solution and Service Revenue Enhancement" by Sandvine, published in the Internet under www.sandvine.com. The latter document also mentions the possibility of inspection of a Hypertext Transfer Protocol (HTTP) User Agent field, which is however considered to be insufficient for detecting tethering activity.

Knowledge about end devices using a communication network may also be useful for other purposes than tethering detection. For example, such knowledge may allow a service provider to offer services which are better adapted to the utilized end device.

Accordingly, there is a need for techniques which allow for efficiently providing enhanced knowledge about end devices connected to a communication network.

SUMMARY

According to an embodiment of the invention, a method for analyzing data traffic in a communication network is provided. According to the method, data traffic in the communication network is monitored. In the data traffic, flows are detected which are based on the HTTP. For each of the flows, a data record is created. The data record comprises at least a User Agent identifier from a message header of a HTTP message of the flow and a device identifier of a UE transmitting the flow. The data records are analyzed to determine a mapping of at least one User Agent identifier in the data records to a corresponding device category.

According to a further embodiment of the invention, a node for a communication network is provided. The node comprises at least one interface for monitoring data traffic in the communication network. Further, the node comprises at least one processor. The at least one processor is configured to detect flows in the data traffic which are based on the HTTP. Further, the at least one processor is configured to create a data record for each of the flows. The data record comprises at least a User Agent identifier from a message header of a HTTP message of the flow and a device identifier of a UE transmitting the flow. Further, the at least one processor is configured to determine a mapping of at least one User Agent identifier in the data records to a corresponding device category.

DETAILED DESCRIPTION

In the following, concepts according to embodiments of the invention will be explained in more detail by referring to the accompanying drawings. The illustrated concepts relate to traffic analysis in a communication network. The communication network may for example be a cellular communication network, e.g., as specified by the 3rd Generation Partnership Project (3GPP). The communication network may support various radio access technologies, e.g., GSM (Global System for Mobile communication), UMTS (Universal Terrestrial Mobile Telecommunications System) or Wideband CDMA (Code Division Multiple Access), CDMA2000, WiMaX, or 3GPP LTE (Long Term Evolution). Further, also wire based access technologies may be supported, such as Digital Subscriber Line (DSL), coaxial cable, or optical fibre.

According to the illustrated concepts, enhanced knowledge about end devices connected to the communication network may be obtained from a database which includes a mapping of one or more HTTP User Agent identifiers to corresponding device categories. The HTTP User Agent identifier corresponds to the content of the User-Agent field in the HTTP header as specified in RFC 2616. The mapping is obtained by analysis of the data traffic in the communication network. In particular, the data traffic in the communication network may be monitored to detect HTTP flows, and for each detected flow, a data record may be generated which includes the HTTP User Agent identifier and further characteristic information related to the UE transmitting the flow, in particular a device identifier, such as the IMEI, and typically also a user identifier, e.g., based on an International Mobile Subscriber Identity (IMSI) or an anonymized version thereof. The data record may also indicate an amount of data transferred in the flow. The data records are then analyzed to determine the mapping which relates a certain HTTP User Agent identifier to a corresponding typical device category. The device category may for example be defined in terms of a device type, a device model, a device manufacturer, and/or a device operating software, in particular operating system (OS). The mapping may be generated to specify the device category as precisely as possible. For example, a certain HTTP User Agent identifier may first be determined to correspond to a specific OS, and a further analysis using the device identifier then may allow a refined determination to map the user agent identifier to a specific device model. In this way a database with a mapping of various HTTP User Agent identifiers to different device categories can be built in an automated way by analyzing data traffic in the communication network. As further explained below, such database, for example, may then be used to efficiently detect tethering activity of subscribers, or for other purposes.

Figure 1:
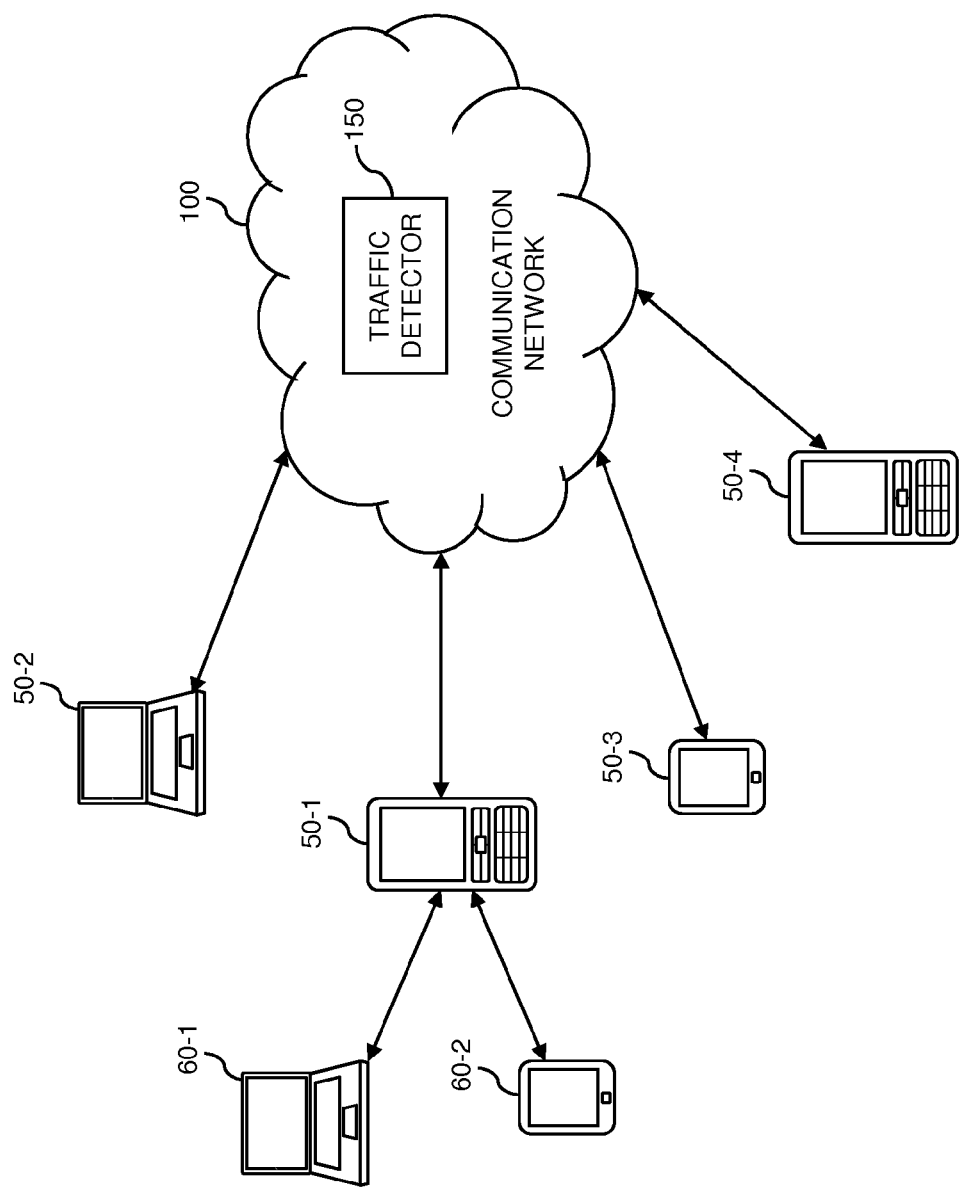
FIG. 1 schematically illustrates an exemplary communication network environment in which traffic analysis according to an embodiment of the invention may be applied.

FIG. 1 illustrates an exemplary communication network environment in which the concepts as outlined above may be applied. Specifically, FIG. 1 illustrates the communication network 100 and a plurality of UEs 50-1, 50-2, 50-3, 50-4 connected to the communication network 100. As illustrated, the UEs 50-1, 50-2, 50-3, 50-4 may correspond to different device types, e.g., a mobile phone, such as the UEs 50-1 and 50-4, a tablet computer, such as the UE 50-3, or a PC, such as the UE 50-2. Moreover, some of such devices may also tether their data connection to other devices, as illustrated for the UE 50-1. In the illustrated scenario, the UE 50-1, which is a mobile phone, tethers further devices in the form of a PC 60-1 and a tablet computer 60-2.

The communication network 100 is in turn equipped with a traffic detector 150, which allows for monitoring and analyzing the data traffic of the various devices 50-1, 50-2, 50-3, 50-4, 60-1, 60-2 which are connected directly or indirectly, via tethering, to the communication network 100. The traffic detector 150 may specifically detect flows in the data traffic which are based on the HTTP protocol and provide traffic data of such flows to a traffic analysis system, as for example illustrated in FIG. 2. The traffic detector 150 may for example be implemented as a Deep Packet Inspection (DPI) probe.

Figure 2:
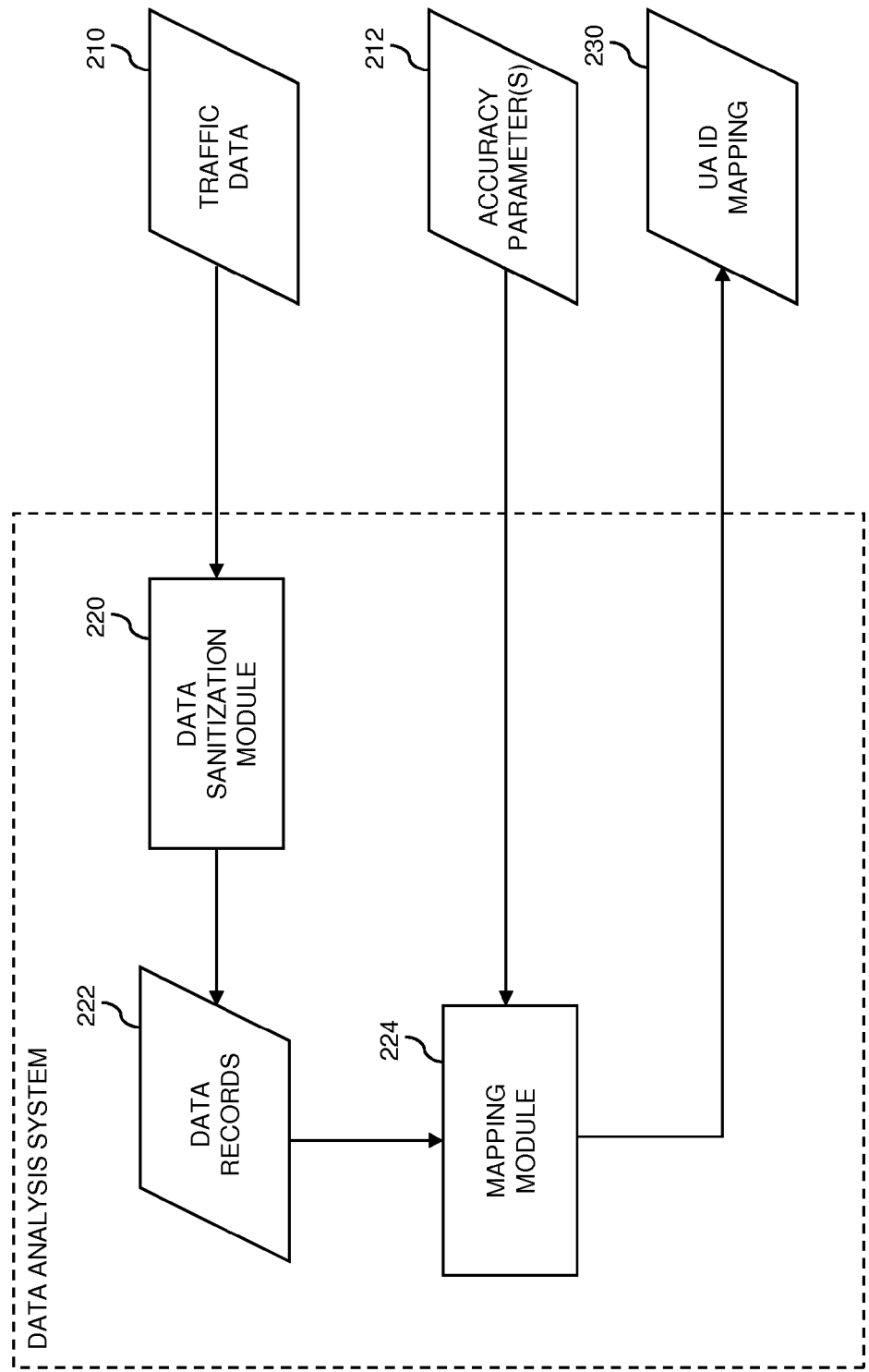
FIG. 2 shows a block diagram for illustrating functionalities of a traffic analysis system according to an embodiment of the invention.

As illustrated in FIG. 2, the traffic analysis system is provided with functionalities for processing the traffic data 210 to generate a mapping 230 between HTTP User Agent identifiers and device categories, in the following also referred to as User Agent identifier (UA ID) mapping. As illustrated, these functionalities include a data sanitization module 220, which conditions the traffic data 210 to generate data records 222, and a mapping module 224, which analyses the data records to generate the UA ID mapping 230.

The data sanitization module 220 may be provided to perform sanitization of raw data records of the traffic data 210 as collected by the traffic detector 150. Such raw data records may be collected over an appropriate time period to collect data which allow for a statistical analysis, e.g., over 1-2 weeks. In some scenarios, also traffic data from other communication networks may be additionally used to improve the data basis for analysis.

The raw data records of the traffic data may in particular include the User Agent identifier from the HTTP header of the detected flow, which contains information about the device 50-1, 50-2, 50-3, 50-4, 60-1, 60-2 generating the flow, e.g., device type, manufacturer, device model, OS, and/or utilized application. This information is generated automatically by the application running on the device.

Further, the raw data records may include the device identifier, e.g., IMEI or IMEI Type Allocation Code (TAC), of the UE 50-1, 50-2, 50-3, 50-4 transmitting the flow.

Further, the raw data records may include the user identifier associated with the UE 50-1, 50-2, 50-3, 50-4 transmitting the flow. The user identifier may for example be the IMSI associated with the UE 50-1, 50-2, 50-3, 50-4 or an anonymized version thereof.

Still further, the raw data records may indicate the amount of data transmitted in connection with the HTTP transaction of the flow, e.g., in terms of a number of transmitted bytes.

The data sanitization module 220 may operate to remove unnecessary elements from the raw data records, e.g., country or language specification fragments in the detected HTTP User Agent identifiers.

The mapping module 224 analyses the data records 222 to generate the UA ID mapping, which maps HTTP User Agent identifiers to specific device categories. For this analysis, the mapping module may assume that the HTTP User Agent identifier generated by a certain device category is distinctive, i.e., different from other device categories.

Depending on the given HTTP User Agent identifier, the device category mapped to it may have different levels of granularity, e.g., terminal type (such as mobile phone, tablet, or PC), device manufacturer, device model, and/or OS of the device. Some HTTP User Agent identifiers may include a direct reference to the device model, which means that for such HTTP User Agent identifiers the device category may be defined in terms of device model. In other cases, the HTTP User Agent identifiers may only reference the device manufacturer or OS, which means that for such HTTP User Agent identifiers the device category may be defined in terms of device manufacturer or OS, respectively.

In the analysis, the device identifiers may be used to determine the correct device category to which a given HTTP User Agent identifier is mapped. For example, if the HTTP User Agent identifier itself does not allow for uniquely identifying the device category, e.g., if the HTTP User Agent identifier indicates a OS which is used for multiple device types, such as an OS used for both mobile phones and tablet computers, the device identifier may be used for resolving such ambiguity. The user identifier may be used for assessing the relevance of the data records. For example, if data records with a certain HTTP User Agent identifier allow for mapping the HTTP User Agent identifier to different categories, e.g., different device types, and such ambiguity cannot be resolved by the device identifier alone, e.g., because some data records include device identifiers pointing to one device category while in other data records the device identifiers point to the other device category, the number of data records with different user identifier may be used to decide which observations are more relevant. For example, if data records which would allow for mapping the HTTP User Agent identifier to a certain device category occur only in connection with a number of different user identifiers which is below a relevance threshold, such data records could be discarded from further analysis or be treated with a lower weight in the statistical analysis. Similarly, the amount of data transmitted in connection with the HTTP transaction as indicated in the data record may be used to resolve such ambiguities. For example, if data records which would allow for mapping the HTTP User Agent identifier to a certain device category occur only in connection with an amount of transferred data which is below a relevance threshold, such data records could be discarded from further analysis or be treated with a lower weight in the statistical analysis. Accordingly, the evaluation of the user identifiers and of the amounts of data indicated in the data records may be used in rules applied for the statistical evaluation of the data records, in particular for assigning a relevance to the data records.

In the above manner, the analysis may be performed to optimize the UA ID mapping in such a way that it includes only those HTTP User Agent identifiers which uniquely identify a certain device category, e.g., a certain device type. Accordingly, entries for HTTP User Agent identifiers which are ambiguous with respect to the device category may be excluded from the generated UA ID mapping. Such ambiguities may on the one hand arise due to the fact that the HTTP User Agent identifier itself is not typical for one specific device category, and on the other hand due to some of the data records being affected by tethering activity. Typically, such optimization of the UA ID mapping involves a trade-off between completeness of the UA ID mapping database and the avoidance ambiguous entries.

The accuracy of the obtained UA ID mapping 230 may be adaptively determined by the operator of the traffic analysis system, e.g., by setting one or more accuracy parameters 212. For example, such accuracy parameters 212 may be used to set the above-mentioned relevance thresholds. Further, such accuracy parameters 212 could be used to define an amount of observations of a certain HTTP User Agent identifier in connection with a device category, which is required to map the HTTP User Agent identifier to this device category. This amount may be defined in terms of the number of corresponding data records, optionally weighted by a relevance parameter, or may be defined in terms of the overall amount of transferred data indicated in the corresponding data records. This amount may also be defined in relation to the amount of observations of the HTTP User Agent identifier in connection with other device categories. For example, if the amount of observations of the HTTP User Agent identifier for one device category exceeds the amount of observations for another device category by a given factor, the HTTP User Agent identifier may be mapped to the former device category. The smaller amount of observations with the other device category may then be discarded as for example being due to tethering. Such factors may be set by the accuracy parameters 212.

A rule set which takes into account the number of different user identifiers observed in the data records of a given HTTP User Agent identifier in connection with a certain device category, referred to as penetration of the HTTP User Agent identifier for this device category, may for example look as follows: 1) If the second highest penetration of the HTTP User Agent identifier is at least 10% of the highest penetration of this HTTP User Agent identifier, the difference in penetration between the different device categories is assumed to be insignificant, and no unique mapping of the HTTP User Agent identifier to a device category can be determined. 2) Penetration for observations affected by tethering is less than 20%, because normal usage is assumed to dominate tethering usage. Accordingly, observations with more than 20% penetration should not be attributed to tethering. 3) Observations with less than 10% penetration may be discarded as being due to tethering.

In some scenarios, further heuristic methods can be applied to assess the effect of tethering in the analysis. For example, known online tethering detection algorithms could be used in the traffic detector 150, e.g., using rules based on the number of parallel flows, destination Internet Protocol (IP) domain, destination port number of Transmission Control Protocol (TCP) or User Datagram Protocol (UDP), traffic pattern, or the like. If tethering is detected with these methods, then the respective raw data records can be discarded already from the traffic data 210.

In some scenarios, the analysis performed by the mapping module 224 may be supplemented by additional rules to filter out and discard certain misleading data records. For example, such rules could filter out and discard data records originating from mobile phone browsers which identify themselves as desktop browsers, e.g., due to misconfiguration of the mobile phone browser. Further, such rules could filter out and discard data records originating from UEs which correspond to devices which are intended to share their internet connection, e.g., routers or dongles (such as UMTS or LTE data sticks). Further, such rules could filter out and discard data records originating from UEs which are known to have an OS which can be easily replaced with another kind of OS.

In some scenarios, the analysis may also be used to detect HTTP User Agent identifiers which are indicative of tethering activity. In the resulting mapping, such HTTP User Agent identifiers could for example be marked as "suspicious". For example, such suspicious HTTP User Agent identifiers could correspond to a device category which is not compatible with devices categories which are allowed to connect to the communication network 100.

The generated UA ID mapping 230 may then be utilized for various purposes to provide enhanced knowledge about end devices. In particular, the UA ID mapping 230 may be used for efficient detection of tethering activity, using the HTTP User Agent identifier as a signature. A corresponding application scenario is illustrated in FIG. 3.

Figure 3:
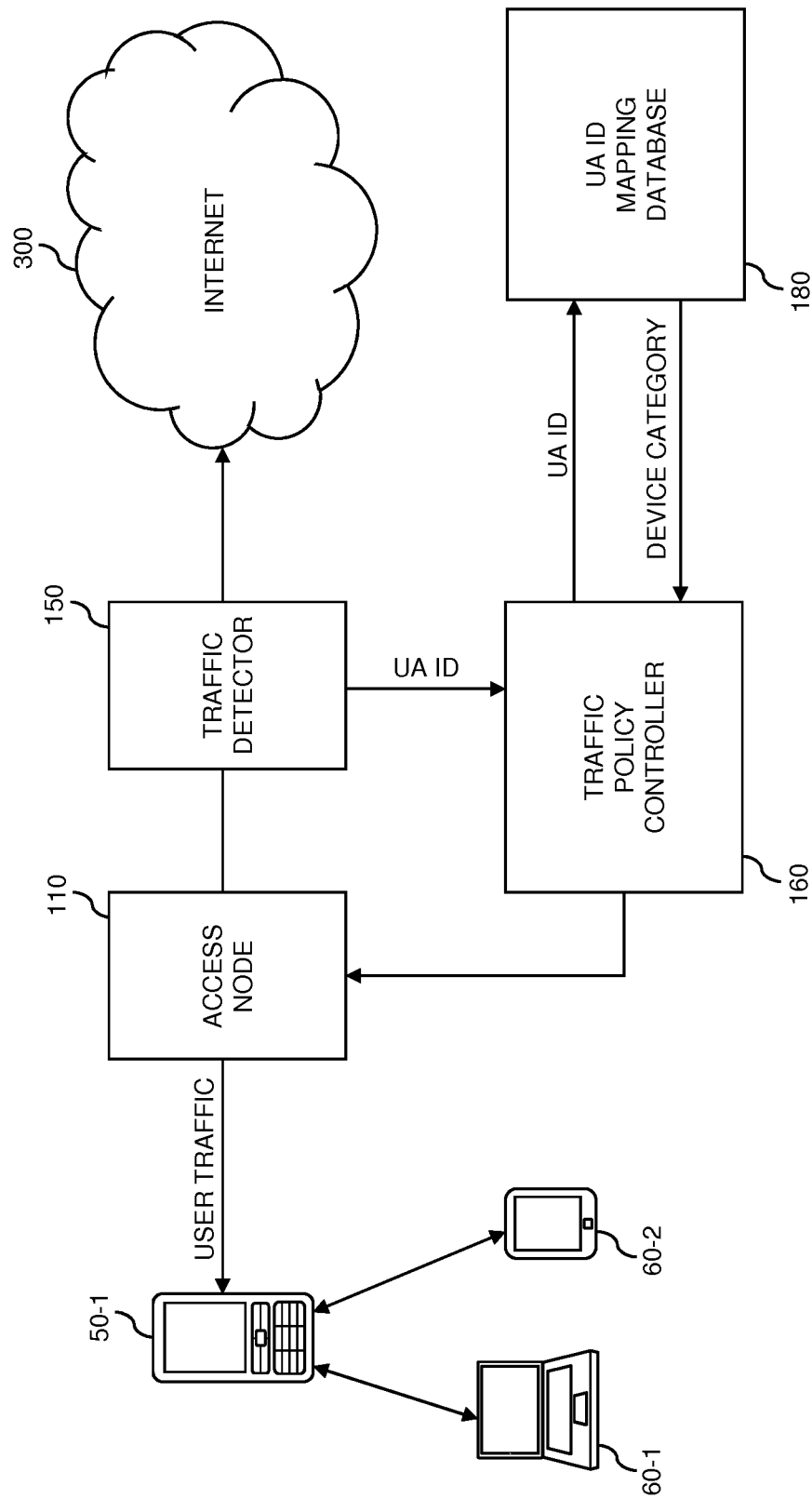
FIG. 3 schematically illustrates an exemplary application scenario according to an embodiment of the invention, in which mapping data as provided by the traffic analysis system are utilized for tethering detection.

In the application scenario of FIG. 3, the user equipment 50-1 uses infrastructure of the communication network 100, illustrated by an access node 110, to access the Internet 300. The access node 110 may for example be a Packet Data Gateway (PGW). Accordingly, user traffic of the UE 50-1 is routed through the access node 110 to the Internet 300 and from the Internet 300 through the access node 110 to the UE 50-1. Further, the user traffic is routed through the traffic detector 150. The traffic detector 150 monitors the user traffic to detect HTTP flows and extracts the HTTP User Agent identifier of such flows.

As further illustrated, the communication network 100 is provided with a traffic policy controller 160, which communicates with the traffic detector 150 and controls the access node 110. For example, the traffic policy controller 160 could be implemented as a Policy and Charging Rules Function (PCRF) according to 3GPP TS 23.203 V12.0.0. The access node 110 may then implement a Policy and Charging Enforcement Function (PCEF) according to 3GPP TS 23.203.

The traffic policy controller 160 further communicates with a database 180 which stores the UA ID mapping. The database 180 may be part of the communication network 100 or may be hosted outside the communication network, e.g., by a provider offering tethering detection assistance to various network operators.

If the traffic detector 150 detects a new HTTP flow in the user traffic of the UE 50-1, this event is reported to the traffic policy controller 160. This specifically involves indicating the HTTP User Agent identifier of the detected HTTP flow to the traffic policy controller 160. The traffic policy controller 160 may then issue a request for the indicated HTTP User Agent identifier to the database 180, and the database 180 may respond with the device category mapped to the HTTP User Agent identifier.

Depending on the indicated device category, the traffic policy controller 160 may then detect whether the UE 50-1 is engaged in tethering activity, as illustrated by devices 60-1 and 60-2. For example, if the HTTP flow detected by the traffic detector 150 originates from the PC 60-1, the device category mapped to the detected HTTP User Agent identifier may indicate "PC" as device type. If this device type is not allowed to connect to the communication network, the traffic policy controller 160 may conclude directly from the indicated device category that the UE 50-1 is engaged in tethering activity. The traffic policy controller 160 could also conclude from previously detected HTTP flows in the user traffic that the user traffic includes data traffic from distinct device categories, e.g., originating from the PC 60-1 and from the UE 50-1 itself, and conclude that the UE 50-1 is engaged in tethering activity.

Having detected the tethering activity of the UE 50-1, the traffic policy controller 160 may apply corresponding measures to control the data traffic through the access node 110. For example, the detected HTTP flow which is attributed to tethering activity could be blocked by providing a corresponding traffic control rule to the access node 110. Alternatively, the detected HTTP flow which is attributed to tethering could be admitted, but be subjected to different charging than other user traffic of the UE 50-1, by providing a corresponding charging rule to the access node 110.

Figure 4:
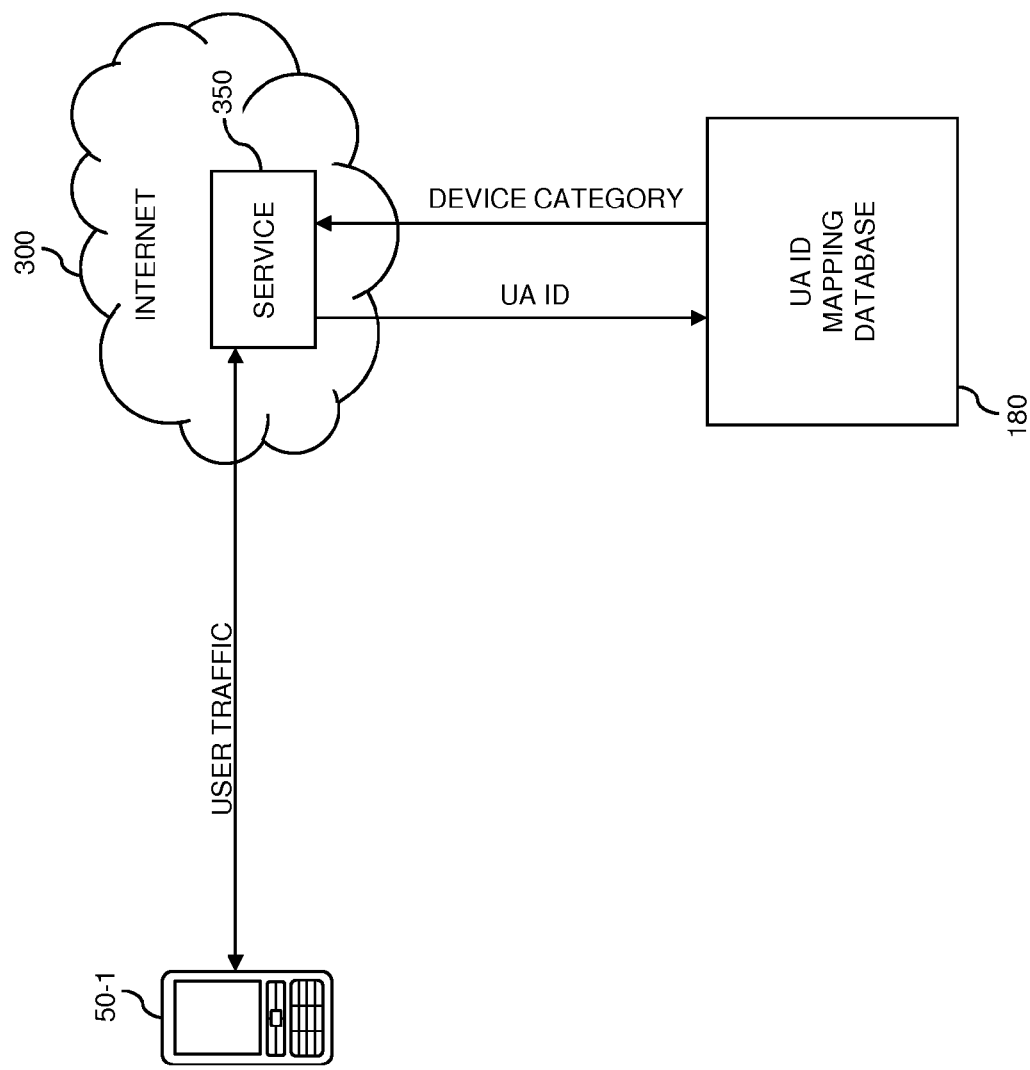
FIG. 4 schematically illustrates an exemplary application scenario according to an embodiment of the invention, in which mapping data as provided by the traffic analysis system are utilized for providing enhanced device information to a service provider.

FIG. 4 shows a further application scenario, a service provider with device information. Also in the scenario of FIG. 4, the UE 50-1 accesses the Internet 300, e.g., using infrastructure of the communication network 100. In particular, the UE 50-1 may access a certain service 350 which is accessible via the Internet.

In the scenario of FIG. 4, the provider of the service 350 communicates with a database 180 which stores the UA ID mapping. The database 180 may be part of the communication network 100 or may be hosted outside the communication network 100.

If the traffic detector 150 receives a new HTTP request from the UE 50-1, it may issue a request for the indicated HTTP User Agent identifier to the database 180, and the database 180 may respond with the device category mapped to the HTTP User Agent identifier. In this way, the provider of the service may be provided with device information which is enhanced as compared to the information conveyed by the HTTP User Agent identifier itself. The provider of the service 350 may use such enhanced information to better adapt the service 350 to the device characteristics of the UE 50-1.

Figure 5:
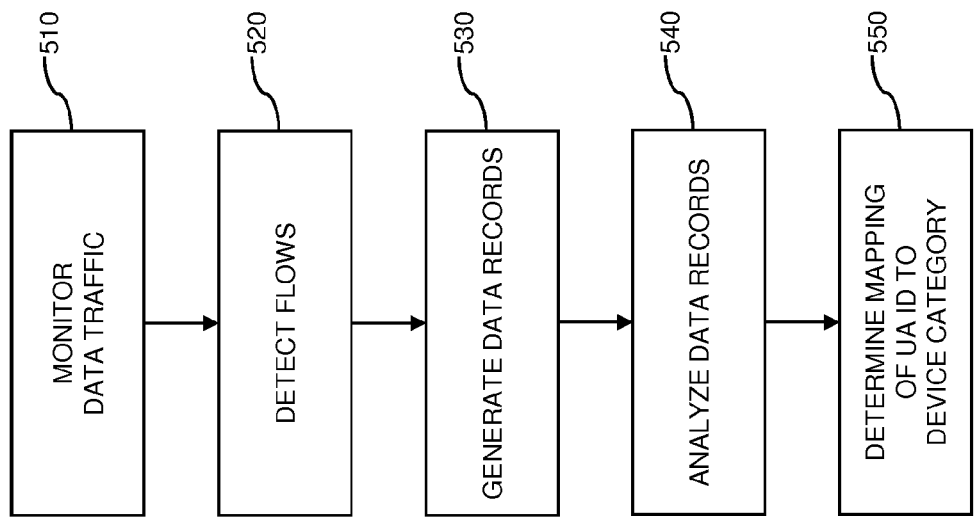
FIG. 5 shows a flowchart for illustrating a method according to an embodiment of the invention.

FIG. 5 shows a flowchart for illustrating a method for analyzing data traffic in a communication network, which may be used to implement the above-mentioned concepts. The communication network may for example correspond to the above-mentioned communication network 100. The steps of the method may for example be performed in a traffic analysis system of the communication network, e.g., as illustrated in FIG. 2.

At step 510, data traffic in the communication network is monitored. This may for example be accomplished by a traffic detector in the communication network, such as the traffic detector 150. The data traffic could also be monitored directly in the traffic analysis system, i.e., functionalities of the traffic detector could be integrated in the traffic analysis system. The monitoring of the data traffic may for example be based on DPI functionalities.

At step 520, HTTP based flows are detected in the data traffic. These HTTP based flows may relate to a plurality of UEs connected to the communication network.

At step 530, a data record is generated for each flow. The data record includes an HTTP User Agent identifier from a message header of a HTTP message of the flow, e.g., from a HTTP request. Further, the data record includes a device identifier of a UE transmitting the flow, such as one of the UEs 50-1, 50-2, 50-3, 50-4 of FIG. 1. The device identifier may for example correspond to an IMEI or IMEI TAC. The data record may also include a user identifier used for access of the user equipment to the communication network. The user identifier may for example be based on the IMSI of the subscription associated with the UE. For privacy reasons, the user identifier may be anonymized. The data record may also indicate an amount of data transmitted in the flow.

At step 540, the data records are analyzed. As described above, this may involve statistical evaluation on the basis of certain rules. If the data records include the user identifier, the analysis may be accomplished on the basis of data records which differ with respect to the included user identifier. For example, a penetration of the HTTP User Agent identifier with respect to different device categories may be evaluated, e.g., using rules as explained above.

In some scenarios, the analysis may also involve assigning a relevance to the data records. This relevance may depend on the user identifiers and/or amounts of transferred data indicated in the data records. For example, a relevance may be assigned to the data records, which depends on the number of data records with the same User Agent identifier but different user identifier and/or on the amount of transferred data indicated in such data records.

At step 550, a mapping of at least one User Agent identifier in the data records to a corresponding device category is determined. The mapping may be optimized to achieve unique mapping of a HTTP User Agent identifier to a single device category. The mapping is determined on the basis of the analysis of step 540. The device category may be defined in terms of a device type, a device model, a device manufacturer, and/or a device operating software.

Figure 6:
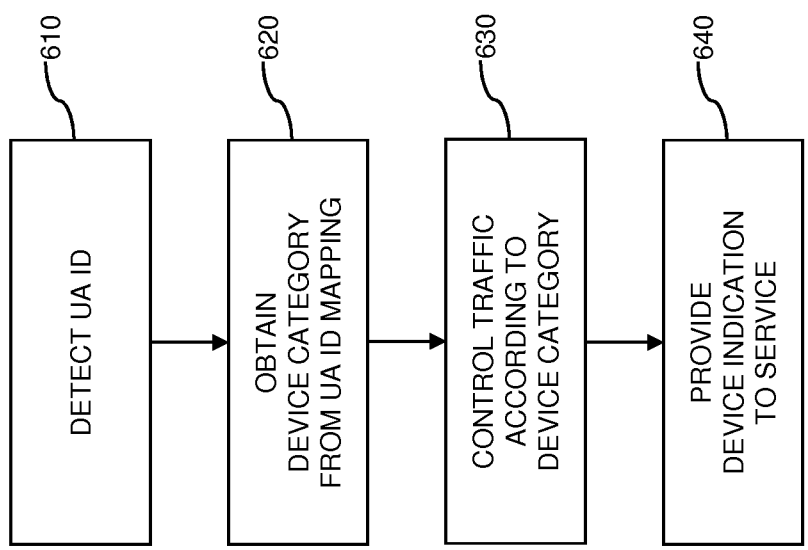
FIG. 6 shows a flowchart for illustrating a further method according to an embodiment of the invention.

FIG. 6 shows a flowchart for illustrating a method for utilizing the mapping as obtained by the method of FIG. 5.

At step 610, a HTTP User Agent identifier is detected in the data traffic of a UE. For example, this may be accomplished by a traffic detector in a communication network through which the data traffic of the UE is routed, e.g., in the communication network 100. A corresponding exemplary scenario is illustrated in FIG. 3. The HTTP User Agent identifier could also be detected by an entity receiving the data traffic, e.g., by a provider of an Internet-based service. A corresponding exemplary scenario is illustrated in FIG. 4.

At step 620, the device category mapped to the HTTP User Agent identifier is obtained, utilizing the mapping as provided by the method of FIG. 5. This may involve issuing a request to a database storing the mapping and receiving the device category in response to the request, e.g., as explained in connection with the database 180 of FIGS. 3 and 4.

At step 630, data traffic may be controlled according to the obtained device category. For example, this may involve blocking certain flows or subjecting certain flows to specific charging rules, as for example explained in connection with FIG. 4. In some cases, data traffic of a UE may also be blocked completely. Such control activities may for example be based on detecting, on the basis of the mapping, a tethering activity of the UE. Accordingly, access of UEs to a communication network may be controlled depending on the mapping.

At step 640, the mapping may be used to providing device information to a network-based service. A corresponding exemplary scenario is illustrated in FIG. 4.

It is noted that the actions of steps 630 and 640 may be performed in combination or as alternatives.

Figure 7:
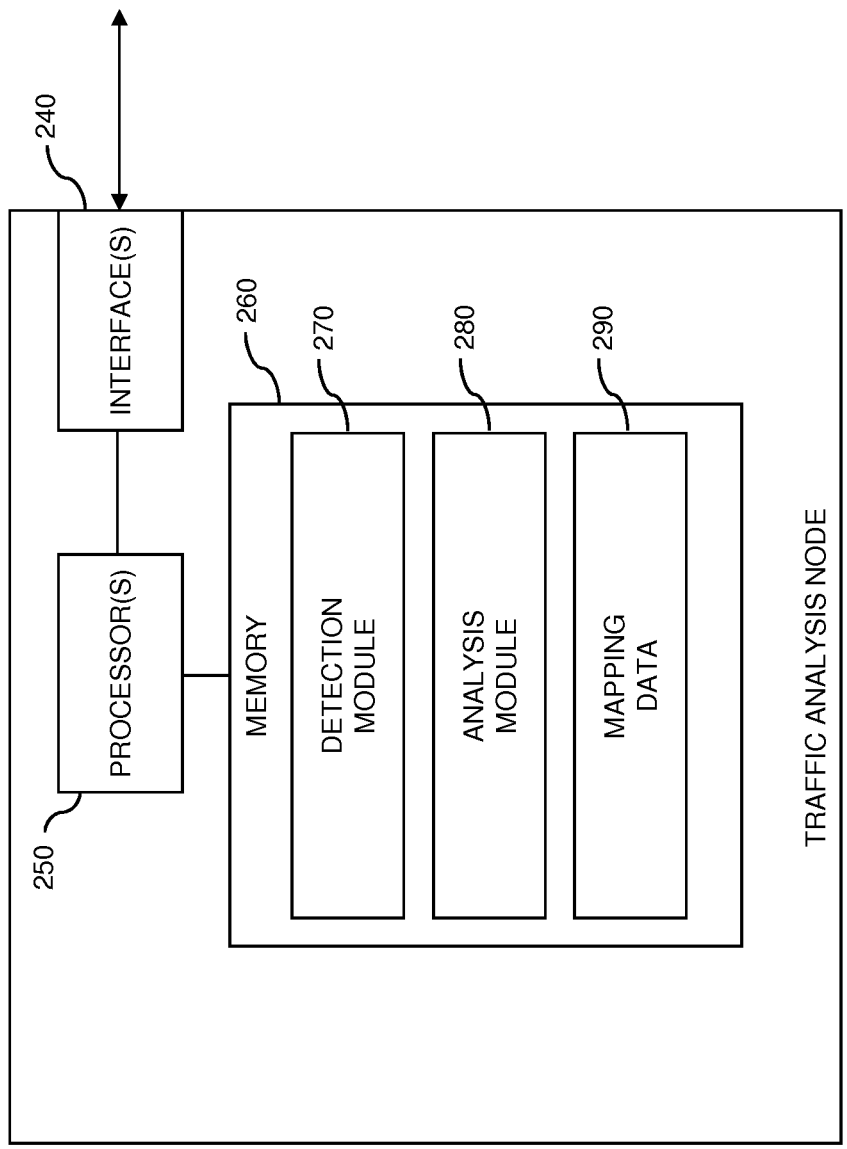
FIG. 7 schematically illustrates structures of a traffic analysis node according to an embodiment of the invention.

FIG. 7 illustrates an exemplary implementation of a traffic analysis node which may be used to implement the above concepts. The illustrated structures may for example be used to implement functionalities as illustrated in FIG. 2.

In the illustrated example, the traffic analysis node includes one or more interfaces 240, which may be used for monitoring data traffic in the communication network. For this purpose, the interface 240 may be used to receive the monitored data traffic or to receive information concerning the monitored traffic from other nodes, such as the traffic detector 150.

Further, the traffic analysis node includes one or more processor(s) 250 coupled to the interface 240 and a memory 260 coupled to the processor(s) 250. The memory 260 may include a read-only memory (ROM), e.g., a flash ROM, a random-access memory (RAM), e.g., a dynamic RAM (DRAM) or static RAM (SRAM), a mass storage, e.g., a hard disk or solid state disk, or the like. The memory 260 includes suitably configured program code to be executed by the processor(s) 250 so as to implement the above-described functionalities of the traffic analysis system. More specifically, the program code in the memory 260 may include a detection module 270 so as to implement the above-described functionalities of detecting HTTP flows and creating the corresponding data records. Further, the program code in the memory 260 may also include an analysis module 280 so as to implement the above-mentioned functionalities of analyzing the data records to determine the mapping. As further, the memory 260 may also include mapping data which represent the generated UA ID mapping. This mapping may be utilized in the traffic analysis node itself or may be provided to other entities, e.g., using the interface 240 or some other interface of the traffic analysis node.

It is to be understood that the structure as illustrated in FIG. 7 is merely schematic and that the traffic analysis node may actually include further components which, for the sake of clarity, have not been illustrated, e.g., further interfaces or further processors. Also, it is to be understood that the memory 260 may include further types of program code modules, which have not been illustrated, e.g., program code modules for implementing known traffic analysis functionalities. According to some embodiments, also a computer program product may be provided for implementing functionalities of the traffic analysis node, e.g., in the form of a medium storing the program code to be stored in the memory 260.

As can be seen, the concepts as described above may be used for implementing efficient and automated generation of a database to provide enhanced device knowledge. This database may for example be utilized for efficient tethering detection, but may be beneficial for other purposes as well. The database may also be used to provide device information to entities outside the communication network, without compromising privacy of subscribers.

It is to be understood that the examples and embodiments as explained above are merely illustrative and susceptible to various modifications. For example, the concepts could be used in connection with various types of communication networks, e.g., including the examples of communication networks as mentioned herein, but also other types of communication networks, e.g., converged networks offering both cellular mobile access and fixed broadband access.

Moreover, it is to be understood that the above concepts may be implemented by using correspondingly designed software to be executed by one or more processors of an existing device, or by using dedicated device hardware. Also, the traffic analysis node as described herein may be implemented by a single device or by multiple devices, e.g., a device cloud or system of cooperating devices.

What is claimed is:

1. A method for analyzing data traffic in a communication network, the method comprising:
   monitoring data traffic in the communication network;
   detecting flows in the data traffic which are based on the Hypertext Transfer Protocol;
   for each of the flows, creating a data record comprising:
      a User Agent identifier from a message header of a Hypertext Transfer Protocol message of the flow, and
      a device identifier of a user equipment transmitting the flow;
   analyzing the data records to determine a mapping of at least one User Agent identifier in the data records to a corresponding device category; and
   on the basis of the mapping, controlling access of user equipments to the communication network.

2. The method according to claim 1, wherein the data record is created to further comprise:
   a user identifier used for access of the user equipment to the communication network.

3. The method according to claim 2, comprising:
   wherein said analyzing of the data records is accomplished on the basis of data records which differ with respect to the included user identifier.

4. The method according to claim 2, comprising:

wherein said analyzing of the data records comprises assigning the data records a relevance which depends on the number of data records with the same User Agent identifier but different user identifier.

5. The method according to claim 2, comprising:

wherein the user identifier is based on an International Mobile Subscriber identity.

6. The method according to claim 2, comprising:

wherein the user identifier is anonymized.

7. The method according to claim 1, wherein the data record is created to further comprise:

an amount of data transmitted in the flow.

8. The method according to claim 7, wherein said analyzing of the data records comprises assigning the data records a relevance which depends on the included amount of data.

9. The method according to claim 1, wherein the device identifier comprises an International Mobile Equipment Identity.

10. The method according to claim 1, wherein the device category is defined in terms of a device type, a device model, a device manufacturer, and/or a device operating software.

11. The method according to claim 1, comprising:

on the basis of the mapping, detecting tethering activity of a user equipment connected to the communication network.

12. The method according to claim 1, comprising:

on the basis of the mapping, providing device information to a network-based service.

13. A node for a communication system, the node comprising:

at least one interface for monitoring data traffic in the communication network; and at least one processor, wherein the at least one processor is configured to:

detect flows in the data traffic which are based on the Hypertext Transfer Protocol;

for each of flows, create a data record comprising:

a User Agent identifier from a message header of a Hypertext Transfer Protocol message of the flow, and a device identifier of a user equipment transmitting the flow;

analyze the data records to determine a mapping of at least one User Agent identifier in the data records to a corresponding device category; and on the basis of the mapping, control access of user equipments to the communication network.

* * * * *